US011955261B2

(12) United States Patent
Abe et al.

(10) Patent No.: US 11,955,261 B2
(45) Date of Patent: Apr. 9, 2024

(54) MAGNETIC ALLOY RIBBON, LAMINATE, AND MAGNETIC CORE

(71) Applicant: TDK CORPORATION, Tokyo (JP)

(72) Inventors: Kyotaro Abe, Tokyo (JP); Isao Nakahata, Tokyo (JP); Takuya Tsukahara, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/893,502

(22) Filed: Aug. 23, 2022

(65) Prior Publication Data

US 2023/0085009 A1 Mar. 16, 2023

(30) Foreign Application Priority Data

Aug. 25, 2021 (JP) ................................ 2021-137466

(51) Int. Cl.

| | |
|---|---|
| ***H01F 1/153*** | (2006.01) |
| ***C22C 45/02*** | (2006.01) |
| ***H01F 3/04*** | (2006.01) |

(52) U.S. Cl.

CPC ......... *H01F 1/15308* (2013.01); *C22C 45/02* (2013.01); *H01F 1/15333* (2013.01); *H01F 3/04* (2013.01)

(58) Field of Classification Search

None

See application file for complete search history.

(56) References Cited

FOREIGN PATENT DOCUMENTS

| | | | |
|---|---|---|---|
| EP | 0 337 716 | B1 | 3/1995 |
| JP | S61-227194 | A | 10/1986 |
| JP | S62-104009 | A | 5/1987 |
| JP | H02-133517 | A | 5/1990 |
| JP | 2716064 | B2 | 2/1998 |
| JP | 2008-150635 | A | 7/2008 |
| JP | 2016-51898 | A | 4/2016 |

OTHER PUBLICATIONS

Minic, Intermetallics, vol. 25, p. 75-79. (Year: 2012).*

* cited by examiner

*Primary Examiner* — Xiaowei Su

(74) *Attorney, Agent, or Firm* — Oliff PLC

(57) ABSTRACT

A specific depth at which a concentration of Fe reaches 10 at % is 18 nm or more and 500 nm or less from the first surface, and from the first surface to the specific depth, the concentration of Fe is less than 10 at %, and a positive increase region is present in which the concentration of Fe increases with a substantially positive concentration gradient, in a case where the concentration of Fe is measured in a depth direction from a first surface of a ribbon.

10 Claims, 7 Drawing Sheets

MAGNETIC ALLOY RIBBON, LAMINATE, AND MAGNETIC CORE

BACKGROUND OF THE INVENTION

Field of the Invention

The present invention relates to a magnetic alloy ribbon, a laminate, and a magnetic core.

Description of the Related Art

A magnetic core of a ceramic element used in a power supply circuit includes a laminated core. Examples of a material include a soft magnetic alloy ribbon having excellent magnetic properties, but the soft magnetic alloy ribbon has a metallic feature of small electric resistance, and thus an eddy current is generated under an AC magnetic field to be used, so that a core loss generated due to the eddy current is remarkable with an increase in frequency.

In order to increase electric resistance between ribbons to reduce this loss, a technique of forming an insulating layer on a surface of a ribbon has been used so far, and there is a method of forming with non-magnetic oxide grains as in, for example, Japanese Patent Laid-Open No. 2016-51898 (Patent Literature 1), Japanese Patent Laid-Open No. 2008-150635 (Patent Literature 2), and Japanese Patent Laid-Open No. Sho 62-104009 (Patent Literature 3). A thickness of the insulating layer depends on a grain size, and a small diameter required for thinning is significantly difficult to handle in a nano region. It is also difficult to form a smooth insulating layer with grains.

Although a vapor deposition method disclosed in Japanese Patent No. 2716064 (Patent Literature 4) makes it easy to form a smooth layer, processing capacity is small and the process cost is high for the use in a laminated core. A smooth layer can also be formed with anodic treatment as in, for example, Japanese Patent Laid-Open No. Hei 2-133517 (Patent Literature 5) or Japanese Patent Laid-Open No. Sho 61-227194 (Patent Literature 6), but it is necessary to prepare a thin film having a uniform surface state with respect to voltage application, and the anodic treatment is of a wet type, and thus labor of a process such as drying after the treatment increases, and the forming is complicated.

Further, in the related art, the insulating layer is formed by adhering different materials from outside, but an uneven stress occurs at an interface with an alloy surface, and when the alloy ribbon is thin, an influence is large, which causes deterioration of the magnetic properties.

SUMMARY OF THE INVENTION

The present invention has been made in view of such circumstances, and an object of the present invention is to provide a magnetic alloy ribbon having a small eddy current loss when used in a laminated manner and having excellent magnetic properties, a laminate, and a magnetic core.

The present inventors have focused on a composition in a depth direction from a surface of a magnetic alloy, and have found that when a specific depth at which a concentration of Fe reaches 10 at % is 18 nm or more and 500 nm or less from a first surface, a magnetic alloy ribbon having a small eddy current loss even when laminated and having excellent magnetic properties can be obtained, and thus have completed the present invention.

That is, a magnetic alloy ribbon according to the present invention is a magnetic alloy ribbon containing Fe, in which a specific depth at which a concentration of Fe reaches 10 at % is 18 nm or more and 500 nm or less from the first surface, and from the first surface to the specific depth, the concentration of Fe is less than 10 at %, and a positive increase region is present in which the concentration of Fe increases with a substantially positive concentration gradient, in a case where the concentration of Fe is measured in a depth direction from a first surface of the ribbon.

According to the present invention, it is possible to provide a magnetic alloy ribbon having a small eddy current loss when used in a laminated manner and having excellent magnetic properties. The reason therefor is not necessarily clear, but it is considered that insulation resistance in the vicinity of the first surface can be increased when the concentration of Fe is less than 10 at % from the first surface to the specific depth and the specific depth at which the concentration of Fe reaches 10 at % is 18 nm or more and 500 nm or less from the first surface. The specific depth at which the concentration of Fe reaches 10 at % is preferably 50 nm or more and 400 nm or less from the first surface. When the specific depth at which the concentration of Fe reaches 10 at % is too deep, a saturation magnetization change rate tends to deteriorate.

At a depth closer to the first surface than the positive increase region, a low Fe concentration region having a concentration of Fe of 0.5 at % or less is preferably continuous at a depth of 10 nm or more. With such a configuration, it is considered that the insulation resistance in the vicinity of the first surface can be further increased.

The magnetic alloy ribbon preferably further contains B. A depth position from the first surface where a concentration of B—O is more than 0 at % is preferably 25 nm or more and less than 360 nm. Since $B_2O_3$ generally has high water absorbency, moisture resistance tends to deteriorate when $B_2O_3$ is exposed on an alloy surface. When the depth position from the first surface where the concentration of B—O is more than 0 at % is 25 nm or more, deterioration of a core loss due to a moisture absorbing factor can be prevented. When the depth position from the first surface where the concentration of B—O is more than 0 at % is too deep, the magnetic properties of the magnetic alloy ribbon tend to deteriorate.

The magnetic alloy ribbon preferably has a composition containing 70 at % or more of Fe. With such a configuration, the magnetic properties of the magnetic alloy ribbon are improved.

A thickness of the magnetic alloy ribbon may be 100 μm or less, and even in such a thin magnetic alloy ribbon, deterioration in magnetic properties is small.

In the present invention, a second surface opposite to the first surface of the ribbon does not necessarily have the same configuration as the first surface, but the second surface may have the same configuration as the first surface. That is, a specific depth at which a concentration of Fe reaches 10 at % may be 18 nm or more and 500 nm or less from the second surface, and from the second surface to the specific depth, the concentration of Fe may be less than 10 at %, and a positive increase region may be present in which the concentration of Fe increases with a substantially positive concentration gradient, in a case where the concentration of Fe is measured in a depth direction from the second surface.

A stacked body according to the present invention has a structure in which the magnetic alloy ribbon described above is stacked. The laminated structure may be a structure in which a single or a plurality of alloy ribbons is wound in a rotation direction, or a structure in which a plurality of alloy ribbons is laminated in a single direction.

A magnetic core according to the present invention includes the magnetic alloy ribbon described above.

DETAILED DESCRIPTION OF THE PREFERRED EMBODIMENTS

Hereinafter, the present invention will be described based on embodiments shown in drawings.

Figure 1A:
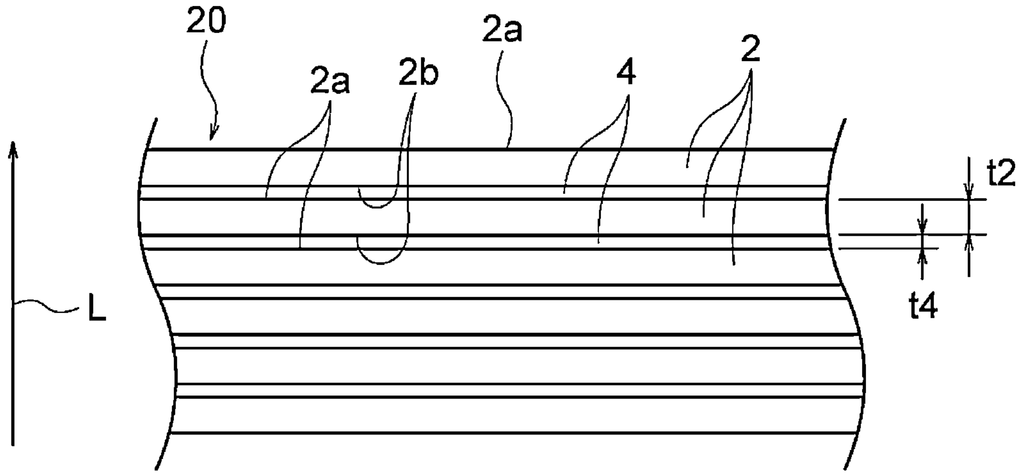
FIG. 1A is a schematic view of a laminate of soft magnetic alloy ribbons according to an embodiment of the present invention.

As shown in FIG. 1A, a laminate(stacked body) 20 according to an embodiment of the present invention is used as, for example, a magnetic core. In the laminate 20, a plurality of soft magnetic alloy ribbons 2 is laminated with an adhesive layer 4 interposed therebetween. Each of the magnetic ribbons 2 has a first surface 2*a* and a second surface 2*b*, and in the embodiment, the magnetic ribbons 2 are laminated such that the first surface 2*a* and the second surface 2*b* of the adjacent magnetic ribbons 2 face each other with the adhesive layer 4 interposed therebetween. Such a laminating method is also referred to as normal laminating.

In the present embodiment, a thickness t2 of the magnetic ribbon 2 is not particularly limited, and is, for example, 5 μm to 150 μm, preferably 100 μm or less, and more preferably 10 μm to 50 μm, all the magnetic ribbons 2 have the same thickness, but may have different thicknesses. A thickness t4 of the adhesive layer 4 is not particularly limited, and is preferably 2 μm or less, 1 μm or less, 0.5 μm or less, more preferably 0.1 μm or less, and particularly preferably 0.05 μm or less.

In the present embodiment, a resin constituting the adhesive layer 4 is not particularly limited, and examples thereof include an insulating resin such as an epoxy resin, a phenol resin, a silicone resin, and an acrylic resin.

Next, the magnetic ribbon 2 will be described in detail.

(Composition of Soft Magnetic Alloy Ribbon) The soft magnetic alloy ribbon 2 according to the present embodiment contains a main component represented by a composition formula $(Fe_{(1-(\alpha+\beta))}X1_{\alpha}X2_{\beta})_{(1-(a+b+c+d+e+f))}M_aB_bP_cSi_dC_eS_f$, in which X1 is one or more selected from the group consisting of Co and Ni, X2 is one or more selected from the group consisting of Al, Mn, Ag, Zn, Sn, As, Sb, Cu, Cr, Bi, N, O, and a rare earth element, M is one or more selected from the group consisting of Nb, Hf, Zr, Ta, Mo, W, Ti, and V, $$0 \le a \le 0.140,$$

$$0 \le b \le 0.200, \text{preferably } 0.020 \le b \le 0.200,$$

$$0 \le c \le 0.150,$$

$$0 \le d \le 0.090,$$

$$0 \le e \le 0.030,$$

$$0 \le f \le 0.030,$$

$$\alpha \ge 0,$$

$$\beta \ge 0, \text{ and}$$

$$0 \le \alpha + \le 0.50 \text{ are satisfied.}$$

At least one of a, c, and d is preferably larger than 0.

A soft magnetic alloy ribbon preferably has a structure including nanocrystals containing Fe as a main component.

When the soft magnetic alloy ribbon having the above composition is subjected to heat treatment, Fe-based nanocrystals are likely to be deposited in the soft magnetic alloy ribbon 2. In other words, the soft magnetic alloy ribbon having the above composition is likely to be a raw material of the soft magnetic alloy ribbon 2 in which the Fe-based nanocrystals are deposited.

The soft magnetic alloy ribbon having the above composition before the heat treatment may have a structure formed of amorphous substances alone, or may have a nano-heterostructure in which initial microcrystals are present in amorphous substances. The initial microcrystals may have an average grain size of 0.3 nm to 10 nm. In the present embodiment, it is assumed that when an amorphization ratio is 85% or more, the soft magnetic alloy ribbon has the structure formed of amorphous substances alone or has the nano-heterostructure.

Here, the Fe-based nanocrystal refers to a crystal having a grain size of nano-order, containing Fe as a main component, and having a crystal structure of a body-centered cubic lattice structure (bcc). In the present embodiment, Fe-based nanocrystals having an average grain size of 5 nm to 30 nm may be deposited. The soft magnetic alloy ribbon 2 in which such Fe-based nanocrystals are deposited is likely to have a high saturation magnetic flux density and low coercivity. In the present embodiment, in a case of a structure containing Fe-based nanocrystals, the amorphization ratio is less than 85%.

Hereinafter, a method for confirming whether the soft magnetic alloy ribbon has a structure formed of an amorphous phase (the structure formed of amorphous substances alone or the nano-heterostructure) or a structure formed of a crystalline phase will be described. In the present embodiment, the soft magnetic alloy ribbon having an amorphization ratio X of 85% or more represented by the following equation (1) has the structure formed of the amorphous phase, and the soft magnetic alloy ribbon having an amorphization ratio X of less than 85% has the structure formed of the crystalline phase.

$$X=100-(Ic/(Ic+Ia)\times 100) \quad (1)$$

Ic: crystalline scattering integrated intensity

Ia: amorphous scattering integrated intensity

The amorphization ratio X is calculated according to the above equation (1) by performing X-ray crystal structure analysis for the soft magnetic alloy ribbon by using X-ray diffraction (XRD), identifying a phase, reading a peak (Ic: crystalline scattering integrated intensity, Ia: amorphous scattering integrated intensity) of crystallized Fe or a compound, and calculating a crystallization ratio based on a peak intensity.

Hereinafter, each component of the soft magnetic alloy ribbon 2 according to the present embodiment will be described in detail.

M is one or more selected from the group consisting of Nb, Hf, Zr, Ta, Mo, W, Ti, and V.

For an amount (a) of M, $0 \le a \le 0.140$ is satisfied. That is, M may not be contained. For the amount (a) of M, $0.020 \le a \le 0.120$ is preferably satisfied, $0.040 \le a \le 0.100$ is more preferably satisfied, and $0.060 \le a \le 0.080$ is particularly preferably satisfied.

When a is large, the saturation magnetic flux density is likely to decrease.

For an amount (b) of B, $0.020 \le b \le 0.200$ is preferably satisfied. In addition, $0.025 \le b \le 0.200$ may be satisfied, $0.060 \le b \le 0.150$ is preferably satisfied, and $0.080 \le b \le 0.120$ is more preferably satisfied. When b is small, a crystalline phase formed by crystals having a grain size larger than 30 nm is likely to be generated in the soft magnetic alloy ribbon before the heat treatment, and when the crystalline phase is generated, the Fe-based nanocrystals cannot be deposited by the heat treatment. The coercivity is likely to increase. When b is large, the saturation magnetic flux density is likely to decrease.

For an amount (c) of P, $0 \le c \le 0.150$ is satisfied. That is, P may not be contained. In addition, $0.030 \le c \le 0.100$ is preferably satisfied, and $0.030 \le c \le 0.050$ is more preferably satisfied. When c is large, the saturation magnetic flux density is likely to decrease.

For an amount (d) of Si, $0 \le d \le 0.090$ is satisfied. That is, Si may not be contained. In addition, $0 \le d \le 0.020$ is preferably satisfied. By containing Si, the coercivity is likely to decrease. When d is large, the coercivity is likely to increase on the contrary.

For an amount (e) of C, $0 \le e \le 0.030$ is satisfied. That is, C may not be contained. In addition, $0.001 \le e \le 0.010$ is preferably satisfied. By containing C, the coercivity is likely to decrease. When e is large, the crystalline phase formed by the crystals having the grain size larger than 30 nm is likely to be generated in the soft magnetic alloy ribbon before the heat treatment, and when the crystalline phase is generated, the Fe-based nanocrystals cannot be deposited by the heat treatment. The coercivity is likely to increase.

For an amount (f) of S, $0 \le f \le 0.030$ is satisfied. That is, S may not be contained. When f is large, the crystalline phase formed by the crystals having the grain size larger than 30 nm is likely to be generated in the soft magnetic alloy ribbon before the heat treatment, and when the crystalline phase is generated, the Fe-based nanocrystals cannot be deposited by the heat treatment. The coercivity is likely to increase.

In the soft magnetic alloy ribbon according to the present embodiment, at least one of a, c, and d is larger than 0. That is, at least one of M, P, and Si is contained. The expression "at least one of a, c, and d is larger than 0" means that at least one of a, c, and d is 0.001 or more. At least one of a and c may be larger than 0. That is, at least one of M and P may be contained. Further, in consideration of significantly decreasing the coercivity, a is preferably larger than 0.

An amount $(1-(a+b+c+d+e+f))$ of Fe is not particularly limited, and is preferably 0.70 or more (containing 70 at % or more of Fe). Alternatively, $0.73 \le (1-(a+b+c+d+e+f)) \le 0.95$ may be satisfied, or $0.73 \le (1-(a+b+c+d+e+f)) \le 0.91$ may be satisfied. When $(1-(a+b+c+d+e+f))$ is within the above range, the crystalline phase formed by the crystals having the grain size larger than 30 nm is further less likely to be generated during manufacturing of the soft magnetic alloy ribbon.

In the soft magnetic alloy ribbon according to the present embodiment, a part of Fe may be substituted with X1 and/or X2.

X1 is one or more selected from the group consisting of Co and Ni. With respect to an amount of X1, $\alpha=0$ may be satisfied. That is, X1 may not be contained. The number of atoms of X1 is preferably 40 at % or less, with respect to a total number of atoms of 100 at % in the composition. That is, $0 \le \alpha \{1-(a+b+c+d+e+f)\} \le 0.40$ is preferably satisfied.

X2 is one or more selected from the group consisting of Al, Mn, Ag, Zn, Sn, As, Sb, Cu, Cr, Bi, N, O, and a rare earth element, With respect to an amount of X2, $\beta=0$ may be satisfied. That is, X2 may not be contained. The number of atoms of X2 is preferably 3.0 at % or less, with respect to a total number of atoms of 100 at % in the composition That is, $0 \le \beta \{1-(a+b+c+d+e+f)\} \le 0.030$ is preferably satisfied.

A range of a substitution amount for substituting Fe with X1 and/or X2 is preferably half or less of Fe on the basis of the number of atoms. That is, $0 \le \alpha+\beta \le 0.50$ is preferably satisfied.

The soft magnetic alloy ribbon according to the present embodiment may contain, as inevitable impurities, elements other than those described above. For example, the inevitable impurities may be contained in an amount of 0.1 wt % or less with respect to 100 wt % of the soft magnetic alloy ribbon.

(Surface Form of Soft Magnetic Alloy Ribbon)

Generally, when the soft magnetic alloy ribbon 2 is manufactured by a method using a roll such as a single-roll method, the soft magnetic alloy ribbon 2 has the first surface **2*a* (a surface contacting with a surface of the roll) and the second surface 2*b* (a surface not contacting with the surface of the roll). The first surface 2*a* and the second surface 2*b*** are surfaces perpendicular to a thickness direction.

In the present embodiment, the first surface **2*a* is subjected to composition analysis with X-ray photoelectron spectroscopy (XPS) in a depth direction to measure a change in an amount of Fe in the depth direction from the surface. For example, as shown in Ex.1 to Ex.3 in FIG. 2, specific depths D1 to D3 at which a concentration of Fe reaches 10 at % are 18 nm or more and 500 nm or less (preferably 50 nm to 400 nm) from a first surface (a 0 position on a horizontal axis in a graph of FIG. 2). For example, in Ex.1 corresponding to Example 1 in FIG. 2, the specific depth D1 is about 70 nm, in Ex.2 corresponding to Example 2, the specific depth D2 is about 140 nm, in Ex.3** corresponding to Example 3, the specific depth D3 is about 180 nm.

Figure 2:
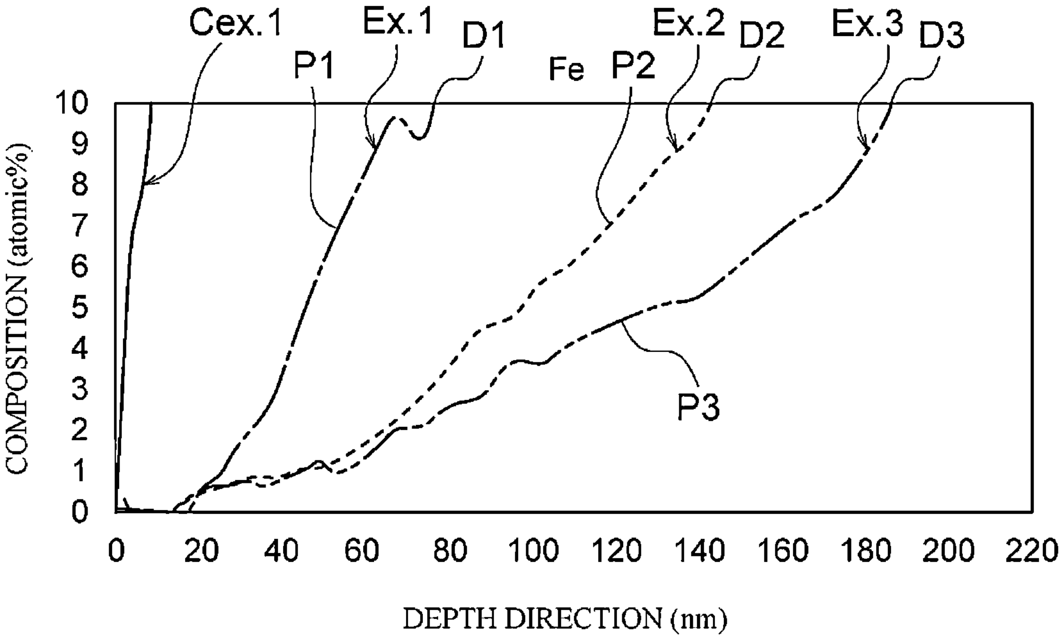
FIG. 2 is a graph showing a result of composition analysis of an amount of Fe in a depth direction from a first surface of each of soft magnetic alloy ribbons according to Examples and Comparative Examples of the present invention.

As shown in FIG. 2, in Examples, from the first surface (a depth 0 position) to the specific depths D1 to D3, each concentration of Fe is less than 10 at %, and positive increase regions P1 to P3 are present in which the concentration of Fe increases with a substantially positive concentration gradient. At a depth closer to the first surface (the depth 0 position) than the positive increase regions P1 to P3, a low Fe concentration region having a concentration of Fe of 0.5 at % or less (preferably 0.3 at % or less) is continuous at a depth of 10 nm or more (preferably 15 nm or more).

Figure 3:
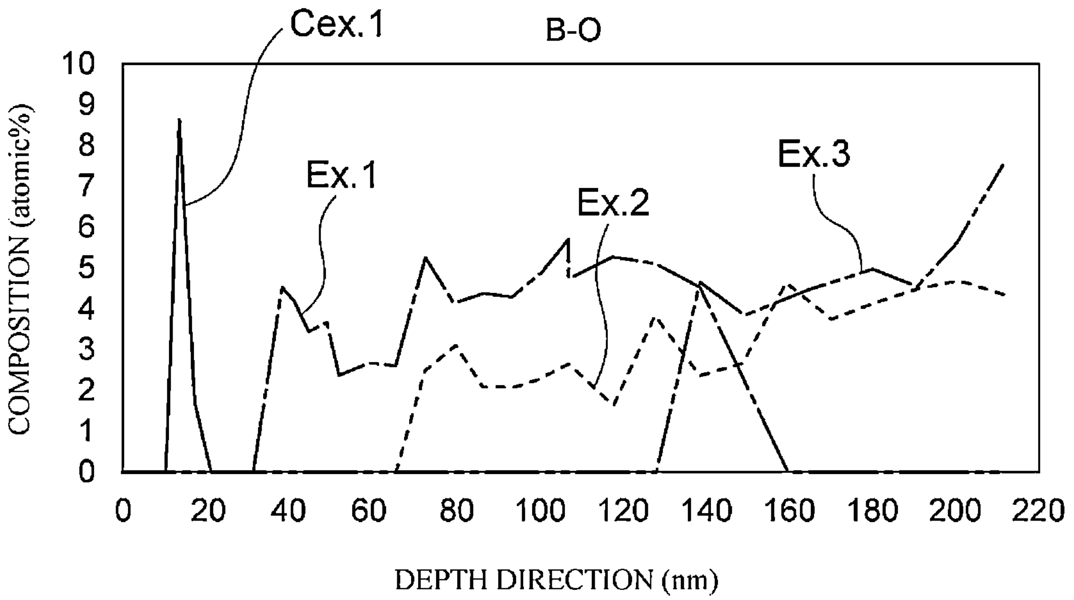
FIG. 3 is a graph showing an analysis result of an amount of B—O in the depth direction from the surface of each of the soft magnetic alloy ribbons according to Examples and Comparative Examples of the present invention.

Further, in the present embodiment, as shown in Ex.1 to Ex.3 in FIG. 3, when a concentration of B—O is measured with XPS in the depth direction from the first surface (a 0 position on a horizontal axis in a graph of FIG. 3), the concentration of B—O is substantially 0 at % from the first surface to at least 20 nm. In the present embodiment, as shown in Ex.1 to Ex.3 in FIG. 3, in a region deeper than 20 nm (preferably deeper than 30 nm), a B—O-containing region having a concentration of B—O of more than 1 at % (preferably more than 2 at % or more than 3 at %) is continuously present.

When the soft magnetic alloy ribbon 2 contains B (boron), the magnetic properties are improved.

A depth position from the first surface where a concentration of B—O is more than 0 at % is preferably 25 nm or more and less than 360 nm. Since $B_2O_3$ generally has high water absorbency, moisture resistance tends to deteriorate when $B_2O_3$ is exposed on an alloy surface. When the depth position from the first surface where the concentration of B—O is more than 0 at % is 25 nm or more, deterioration of a core loss due to a moisture absorbing factor can be prevented. When the depth position from the first surface where the concentration of B—O is more than 0 at % is too deep, the magnetic properties of the soft magnetic alloy ribbon tend to deteriorate.

Figure 4:
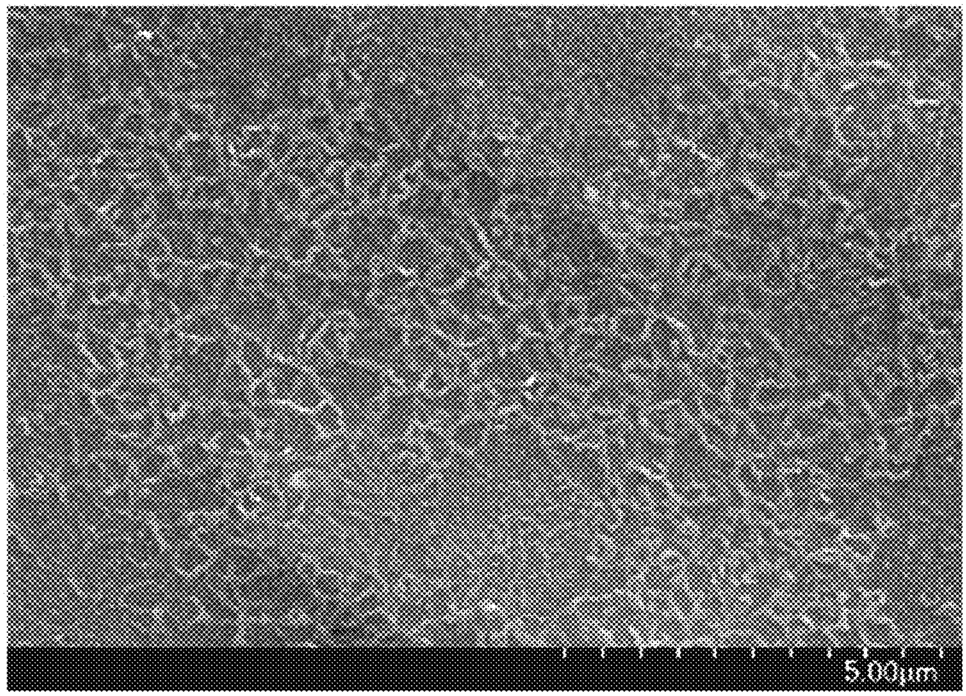
FIG. 4 is an example of a scanning electron microscope (SEM) image of a first surface of the soft magnetic alloy ribbon according to the embodiment of the present invention.

Further, in the present embodiment, as shown in FIG. 4, convex portions having an average convex portion height of preferably 7 nm to 130 nm and more preferably 10 nm or more and less than 100 nm (hereinafter, also referred to as convex portions having a predetermined range height) may appear in a continuous convex pattern shape (including a mesh pattern shape) on the first surface 2*a*.

In the present embodiment, unlike the first surface 2*a*, the above concentration distribution of Fe, concentration distribution of B—O, or convex portions having a predetermined range height do not need to appear on the second surface 2*b*. However, in another embodiment of the present invention, the above concentration distribution of Fe, concentration distribution of B—O, or convex portions having a predetermined range height may appear on the second surface 2*b* alone or on both the first surface 2*a* and the second surface 2*b*.

In the following description, a case where convex portions having a predetermined range height appear on an alloy surface as the first surface 2*a* will be described.

Figure 5:
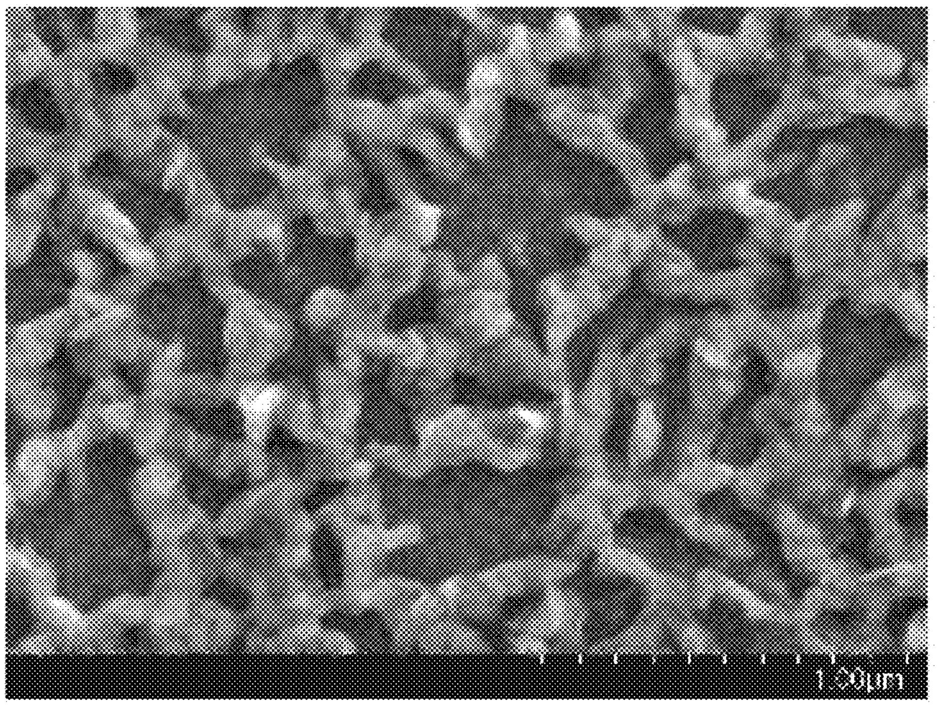
FIG. 5 is an SEM image showing an example of the present invention in which a part of the SEM image shown in FIG. 4 is enlarged.

When the first surface 2*a* of the soft magnetic alloy ribbon 2 according to the present embodiment is observed at a magnification of 10,000 times with, for example, a scanning electron microscope (SEM), as shown in FIG. 4, convex portions (white portions) are observed in a continuous convex pattern shape (including a mesh pattern shape). FIG. 5 shows an example of an SEM image in which convex portions (white portions) having a predetermined range height are further enlarged.

As shown in FIG. 5, the convex portions having the predetermined range height are formed in a pattern shape which are continuous with each other. An average height of the convex portions shown in FIG. 5 can be calculated by imaging with, for example, an atomic force microscope (AFM).

In the present embodiment, in a case where the convex portions having the predetermined range height are present on the first surface 2*a*, an area ratio of the convex portions on the first surface 2*a* is preferably 15% or more and 100% or less, and more preferably 65% or more and 85% or less.

In a case of determining presence or absence of a convex portion, the determination is made based on presence or absence of a local maximum portion in height distribution of a local region in AFM. For example, by limiting a region in which height distribution in an AFM image is to be observed to a local region and randomly selecting a predetermined number of local regions at intervals of 1 μm or more in an area of 10 μm×10 μm, it is possible to satisfactorily evaluate presence or absence, a height, and an area ratio of a very small convex portion.

Specifically, in a case of measuring an area ratio of a convex portion, first, a height is measured at intervals of 40 nm (26×26 points) with respect to a square region of 1 m×1 μm using AFM, and presence or absence of the convex portion is confirmed based on distribution obtained by performing primary inclination correction on height distribution with respect to two vertical and horizontal axes. For example, when a local maximum value larger than a median value of the distribution by a predetermined value (for example, 10 nm) or more exists, it is determined that a convex portion is present in the region of 1 m×1 m, and when the local maximum value does not exist, it is determined that no convex portions are present in the region of 1 m×1 m.

A convex portion height can be calculated as a standard deviation σ of height distribution×4 (maximum−minimum corresponding to 95% of normal distribution). In an area of 10 μm×10 μm, 20 square regions of 1 m×1 μm randomly selected at intervals of 1 μm or more are measured, and an average of heights of convex portions can be defined as an average convex portion height. In calculation of an area ratio of a convex portion, when there is a region in which a convex portion having a height higher than the median value of the distribution by a predetermined height (for example, 10 nm) or more is not present, an area of a convex portion height in the measurement region is calculated as 0. Further, a value obtained by dividing, with respect to a total number of measurement points, the number of measurement points at which a convex portion having a height higher than the median value of the distribution by a predetermined height (for example, 10 nm) or more can be confirmed by the total number of measurement points is defined as an area ratio of a convex portion.

(Method for Manufacturing Soft Magnetic Alloy Ribbon)

Hereinafter, a method for manufacturing the soft magnetic alloy ribbon according to the present embodiment will be described.

The method for manufacturing the soft magnetic alloy ribbon according to the present embodiment is optional. For example, there is a method for manufacturing the soft magnetic alloy ribbon by a single-roll method. The ribbon may be a continuous ribbon.

In the single-roll method, first, pure metals of metal elements contained in a soft magnetic alloy ribbon to be finally obtained are prepared and weighed so as to have a composition same as that of the soft magnetic alloy ribbon to be finally obtained. Then, the pure metals of metal elements are melted and mixed to prepare a base alloy. A method for melting the pure metals is optional, and for example, there is a method for melting the pure metals by high-frequency heating after vacuum-evacuating the pure metals in a chamber. The base alloy and the soft magnetic alloy ribbon to be finally obtained usually have the same composition.

Next, the prepared base alloy is heated and melted to obtain a molten metal. A temperature of the molten metal is not particularly limited, and may be, for example, 1200° C. to 1500° C.

In the single-roll method according to the present embodiment, a ribbon is manufactured in a rotation direction of a rotating roll by injecting and supplying the molten metal from a nozzle toward the roll inside the chamber. In the present embodiment, a material of the roll is optional. For example, a roll made of Cu is used.

In the present embodiment, a temperature of the roll is not particularly limited, and is, for example, 5° C. to 30° C., and a differential pressure (an injection pressure) between an inside of the chamber and an inside of the injection nozzle is also not particularly limited, and is preferably, for example, 20 kPa to 80 kPa.

In the single-roll method, a thickness of the ribbon 2 to be obtained can be adjusted mainly by adjusting a rotation speed of the roll, but the thickness of the ribbon 2 to be obtained can also be adjusted by adjusting, for example, an interval between the nozzle and the roll, the temperature of the molten metal, or the like. When the injection pressure is small, the ribbon 2 may also be formed by adjusting the interval between the nozzle and the roll, the temperature of the molten metal, or the like.

A vapor pressure inside the chamber is not particularly limited. For example, the vapor pressure inside the chamber may be set to 11 hPa or less by using an Ar gas whose dew point is adjusted. A lower limit of the vapor pressure inside the chamber is not particularly present. The vapor pressure may be set to 1 hPa or less by filling the Ar gas whose dew point is adjusted, or the vapor pressure may be set to 1 hPa or less in a state close to a vacuum.

The soft magnetic alloy ribbon 2 before the heat treatment preferably does not contain crystals having a grain size larger than 30 nm. The soft magnetic alloy ribbon 2 before the heat treatment may have a structure formed of amorphous substances alone, or may have a nano-heterostructure in which initial microcrystals are present in amorphous substances.

A method for confirming whether crystals having a grain size larger than 30 nm are contained in the ribbon 2 is not particularly limited. For example, presence or absence of crystals having a grain size larger than 30 nm can be confirmed by normal X-ray diffraction measurement.

A method for observing presence or absence and an average grain size of the initial microcrystals is not particularly limited, and for example, the presence or absence and the average grain size of the initial microcrystals can be confirmed by using a transmission electron microscope to obtain a selected area diffraction image, a nanobeam diffraction image, a bright field image, or a high resolution image of a sample sliced by ion milling. In a case of using a selected area diffraction image or a nanobeam diffraction image, ring-shaped diffraction is formed when a diffraction pattern is amorphous, whereas a diffraction spot due to a crystal structure is formed when the diffraction pattern is not amorphous. In a case of using a bright field image or a high resolution image, the presence or absence and the average grain size of the initial microcrystals can be observed by visual observation at a magnification of $1.00\times10^5$ times to $3.00\times10^5$ times.

Next, the soft magnetic alloy ribbon 2 is subjected to the heat treatment. In the present embodiment, a specific concentration distribution of Fe can be formed on the first surface 2*a* by the heat treatment for the first surface 2*a* (and/or the second surface 2*b*/hereinafter omitted) of the soft magnetic alloy ribbon 2 under a specific atmosphere. Depending on heat treatment conditions, a convex portion having a predetermined range height can also be formed.

In the present embodiment, the specific concentration distribution of Fe can be formed in the depth direction from the first surface 2*a* by performing second-stage heat treatment in which heat treatment is performed at a predetermined temperature under an inert atmosphere after a first stage in which heat treatment is performed at a predetermined temperature under an active atmosphere. Examples of gases contained in the active atmosphere include hydrogen as a reduction active atmosphere and oxygen as an oxidation active atmosphere, and the air may also be used as the oxidation active atmosphere. Examples of gases contained in the inert atmosphere include nitrogen and argon, and a state of low oxygen concentration in which a small amount of oxygen is contained in these gases may also be used.

Conditions for the heat treatment in the first stage are such that under an atmosphere where a concentration of hydrogen gas is 1 vol % to 10 vol %, a heat treatment temperature is 200° C. to 500° C., and a heat treatment time is about 0.1 hours to 5 hours. Conditions for the heat treatment in the second stage are such that under an atmosphere where a concentration of oxygen gas is 0 vol % to 10 vol %, a heat treatment temperature is 200° C. to 500° C., and a heat treatment time is about 0.1 hours to 100 hours. In a case of such heat treatment conditions, it is easy to form the specific concentration distribution of Fe on the first surface 2*a*. When the heat treatment is performed at a temperature equal to or higher than a temperature at which Fe-based nanocrystals are deposited, Fe-based nanocrystals are deposited.

As the concentration of oxygen gas under the inert atmosphere is increased, a specific depth at which a concentration of Fe reaches 10 at % can be increased. As the heat treatment temperature is increased, the specific depth at which the concentration of Fe reaches 10 at % can be increased. Further, as the heat treatment time is increased, the specific depth at which the concentration of Fe reaches 10 at % can be increased.

In the above embodiment, the first surface 2*a* alone is exposed to the specific atmosphere and subjected to the heat treatment to form the specific concentration distribution of Fe on the first surface alone, but the second surface 2*b* may also be exposed to the specific atmosphere and subjected to the heat treatment. In this case, the specific concentration distribution of Fe can also be formed on the first surface 2*a* and/or the second surface 2*b*.

SUMMARY OF THE PRESENT EMBODIMENT

In the soft magnetic alloy magnetic ribbon 2 according to the present embodiment, in the case where the concentration of Fe is measured in the depth direction from the first surface 2*a*, the specific depth at which the concentration of Fe reaches 10 at % is 18 nm or more and 500 nm or less from the first surface. From the first surface to the specific depth, the concentration of Fe is less than 10 at %, and the positive increase region is present in which the concentration of Fe increases with the substantially positive concentration gradient.

According to the present embodiment, it is possible to provide a magnetic alloy ribbon having a small eddy current loss when used in a laminated manner and having excellent magnetic properties. The reason therefor is not necessarily clear, but it is considered that insulation resistance in the vicinity of the first surface can be increased when the concentration of Fe is less than 10 at % from the first surface to the specific depth and the specific depth at which the concentration of Fe reaches 10 at % is 18 nm or more and 500 nm or less from the first surface. The specific depth at which the concentration of Fe reaches 10 at % is preferably 50 nm or more and 400 nm or less from the first surface. When the specific depth at which the concentration of Fe reaches 10 at % is too deep, the magnetic properties (for example, a saturation magnetization change rate) tends to deteriorate.

In the present embodiment, as shown in Ex.1 to Ex.3 in FIG. 2, at the depth closer to the first surface (the 0 position on the horizontal axis) than the positive increase regions P1 to P3, the low Fe concentration region having the concentration of Fe of 0.5 at % or less (substantially 0 at %) is continuous at the depth of 10 nm or more. With such a configuration, it is considered that the insulation resistance in the vicinity of the first surface can be further increased.

Further, the magnetic alloy ribbon 2 according to the present embodiment is a magnetic alloy ribbon further containing B. As shown in Ex.1 to Ex.3 in FIG. 3, when the concentration of B—O is measured in the depth direction from the first surface (the 0 position on the horizontal axis), the concentration of B—O is substantially 0 at % from the first surface to at least 20 nm. In the region deeper than 20 nm, the B—O-containing region having the concentration of B—O more than 1 at % is continuously present.

For example, in Ex.1 in FIG. 3, in a region deeper than 30 nm, the B—O-containing region having the concentration of B—O more than 2 at % is continuously present. In Ex.2 in FIG. 3, in a region deeper than 60 nm, the B—O-containing region having the concentration of B—O more than 2 at % is continuously present. Further, in Ex.3 in FIG. 3, in a region deeper than 120 nm, the B—O-containing region having the concentration of B—O more than 3 at % is continuously present.

When the soft magnetic alloy ribbon 2 contains B (boron), the magnetic properties are improved. In the present embodiment, as shown in Ex.1 to Ex.3 in FIG. 3, the depth position from the first surface where the concentration of B—O is more than 0 at % is 25 nm or more and less than 360 nm (25 nm or more and less than 160 nm in FIG. 3). Since $B_2O_3$ generally has the high water absorbency, the moisture resistance tends to deteriorate when $B_2O_3$ is exposed on the alloy surface. When the depth position from the first surface where the concentration of B—O is more than 0 at % is 25 nm or more, the deterioration of the core loss due to the moisture absorbing factor can be prevented. When the depth position from the first surface where the concentration of B—O is more than 0 at % is too deep, the magnetic properties of the magnetic alloy ribbon tend to deteriorate.

In the present embodiment, the soft magnetic alloy ribbon 2 has a composition containing 70 at % or more of Fe. With such a configuration, the magnetic properties of the magnetic alloy ribbon are improved.

Further, in the present embodiment, the thickness t2 of the soft magnetic alloy ribbon 2 may be 100 μm or less, and even in such a thin magnetic alloy ribbon 2, the deterioration in magnetic properties is small.

Figure 6:
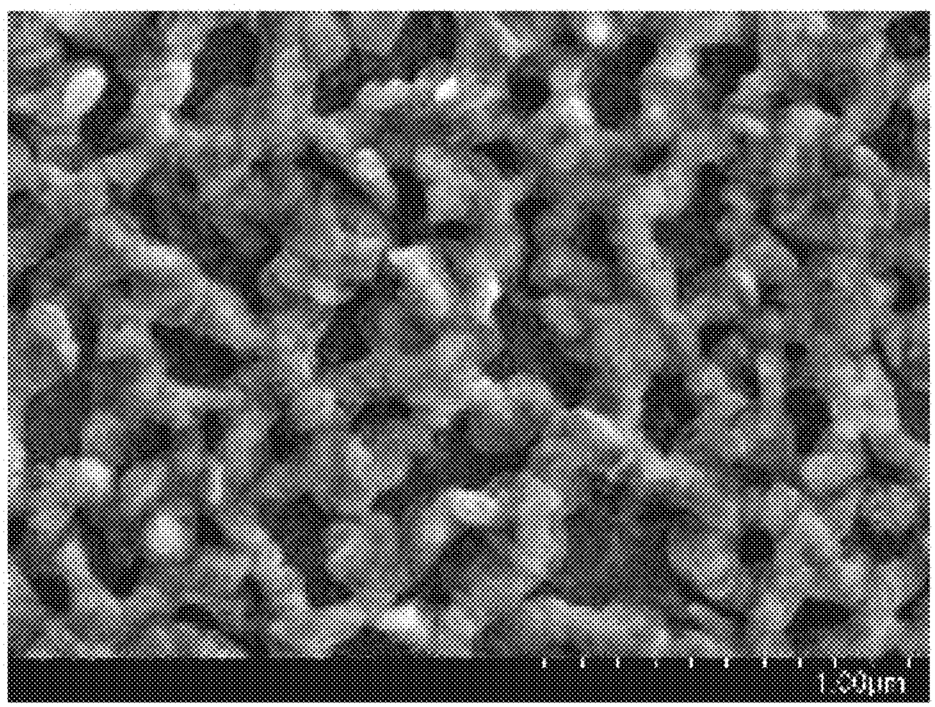
FIG. 6 is an enlarged SEM image with the same magnification as that of FIG. 5 according to another example of the present invention.

Further, in the present embodiment, the first surface 2*a* and/or the second surface 2*b* may have the convex portions as shown in, for example, FIGS. 4 to 6. The convex portions having the average convex portion height of preferably 7 nm to 130 nm and more preferably 10 nm or more and less than 100 nm may be present in the continuous convex pattern shape (including the mesh pattern shape).

By forming such convex portions on the alloy surface, wettability of the surface is improved, and a coverage ratio of the resin is increased. Slipperiness of the surface is improved, and a filling property is improved at the time of molding into a magnetic core, so that magnetic permeability is increased.

In the present embodiment, in the case where the convex portions are formed on the first surface 2*a*, an area ratio of convex portions having an average height of 10 nm or more is preferably 15% or more and 100% or less, and more preferably 65% or more and 85% or less. Within such a range, particularly, a balance is excellent between the increase of the coverage ratio of the resin constituting the adhesive layer 4 with respect to the first surface 2*a* and the increase of the magnetic permeability.

In the present embodiment, a laminated structure of the laminate 20 may be a structure in which a single or a plurality of alloy ribbons 2 is wound in a rotation direction, or may be a structure in which a plurality of alloy ribbons 2 is laminated in the same lamination direction L as shown in FIG. 1A.

Figure 1B:
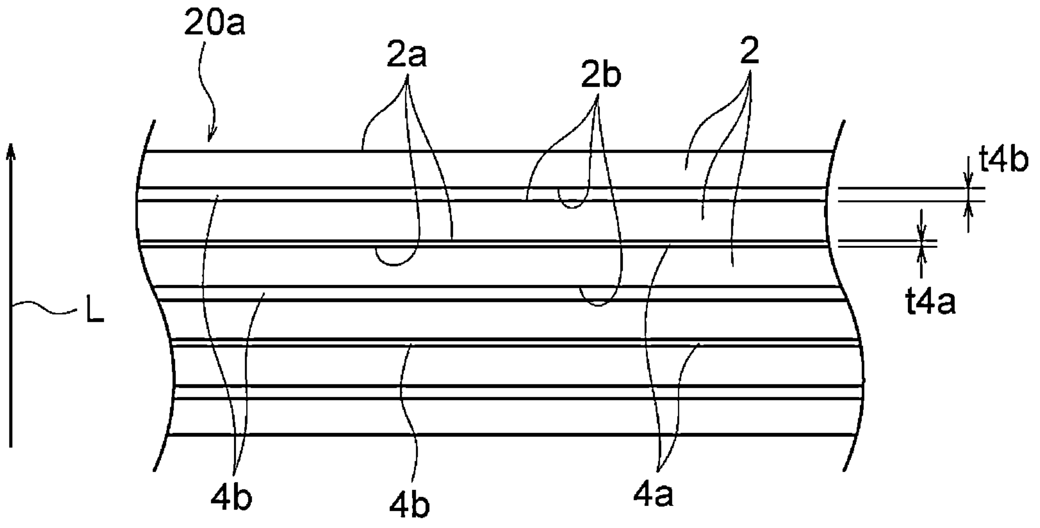
FIG. 1B is a schematic view of a laminate according to another embodiment of the present invention.

Alternatively, as shown in FIG. 1B, a laminated structure (a facing laminated structure) may be used in which a laminate having the second surfaces 2*b* of the adjacent alloy ribbons 2 facing each other and a laminate having the first surfaces 2*a* of the adjacent alloy ribbons 2 facing each other alternately appear along the lamination direction L. In a laminate 20*a* having a facing laminated structure according to an embodiment shown in FIG. 1B, a thickness t4*a* of an adhesive layer 4*a* disposed at a position where the first surfaces 2*a* where a specific concentration distribution of Fe appears face each other, and/or a thickness t4*b* of an adhesive layer 4*b* disposed at a position where the second surfaces 2*b* face each other are not particularly limited, and may be about the same as the thickness t4 of the adhesive layer 4 shown in FIG. 1A.

When a method such as resin impregnation is adopted, the thickness t4*a* of the adhesive layer may also be made substantially zero.

In the embodiment shown in FIG. 1B, at the position where the first surfaces 2*a* where the specific concentration distribution of Fe appears face each other, a region having a low concentration of Fe is formed at a boundary of about 20 nm (10 nm+10 nm) or more, which is considered to contribute to prevention of eddy current without separately interposing an insulating layer other than the ribbon.

The laminates 20 and 20*a* according to the above embodiments may be used for, for example, a motor, a transformer, a switching power supply, a resonant power supply, a high-frequency transformer, a noise filter, or a choke coil.

The present invention is not limited to the above embodiments, and various modifications can be made within the scope of the present invention. For example, instead of the adhesive layers 4, 4*a*, and 4*b*, an insulating sheet made of an organic material such as plastic or rubber may be used. The magnetic alloy ribbon according to the present invention is not limited to the soft magnetic alloy ribbon, and may be a hard magnetic alloy ribbon.

EXAMPLES

Hereinafter, the present invention will be described based on more detailed Examples, but the present invention is not limited to these Examples.

Example 1

Raw material metals were weighed to obtain an alloy composition of $Fe_{82}Nb_{5.5}B_9P_{1.5}Si_2$, and melted by high-frequency heating to prepare a base alloy. Thereafter, the prepared base alloy was heated and melted to form a metal in a molten state at 1250° C., and the metal in the molten state was injected onto a roll by a single-roll method in which the roll was rotated at a rotation speed of 25 m/sec to prepare a ribbon. A material of the roll was Cu.

A roll temperature was set to 10° C. to 20° C. The differential pressure (the injection pressure) between the inside of the chamber and the inside of the injection nozzle was set to 30 kPa to 80 kPa. A thickness of an obtained soft magnetic alloy ribbon was set to 20 μm to 30 μm, and a length of the ribbon was set to several tens of meters.

After Fe-based nanocrystals were deposited, the heat treatment was performed on the soft magnetic alloy ribbon under the specific atmosphere. In the first stage, a hydrogen gas having a concentration of 2 vol % in nitrogen was used, the heat treatment temperature was set to 300° C., and the heat treatment time was set to one hour. In the second stage, an oxygen gas having a concentration of 0.2 vol % in nitrogen was used, the heat treatment temperature was set to 400° C., and the heat treatment time was set to 1 hour.

A surface (a first surface) of a ribbon sample after the heat treatment was subjected to composition analysis with X-ray photoelectron spectroscopyby (XPS) in a depth direction. Results of examining concentration distribution (at %) of Fe in the depth direction from the surface are shown in Ex.1 in FIG. 2. As shown in FIG. 2, it was confirmed that the specific depth D1 at which the concentration of Fe reached 10 at % (Fe 10at % reach depth in Table 1) was about 70 nm from the 0 position on the horizontal axis, and was 18 nm or more and 500 nm or less (or 50 nm to 400 nm).

As shown in FIG. 2, in Example 1, it was confirmed that from the surface depth 0 position to the specific depth D1, the concentration of Fe was less than 10 at %, and the positive increase region P1 was present in which the concentration of Fe increased with the substantially positive concentration gradient. In addition, it was confirmed that at the depth closer to the depth 0 position than the positive increase region P1, the low Fe concentration region having the concentration of Fe of 0.5 at % or less (substantially 0 at %) was continuous at a depth of 15 nm or more.

Further, in Example 1, as shown in Ex.1 in FIG. 3, it was confirmed that when the concentration of B—O was measured with XPS in the depth direction from the first surface (the 0 position on the horizontal axis in the graph of FIG. 3), the concentration of B—O was substantially 0 at % from the first surface to at least 20 nm. In Example 1, as shown in Ex.1 in FIG. 3, it was confirmed that in the region deeper than 20 nm (preferably deeper than 30 nm), the B—O-containing region having the concentration of B—O of more than 2 at % or more than 3 at % was continuously present.

Further, as shown in FIG. 3, in Example 1, it was confirmed that the depth position from the first surface where the concentration of B—O was more than 0 at % ("B—O expression depth" also shown in Table 1) was about 35 nm, and was 25 nm or more and less than 360 nm.

Saturation magnetization of the ribbon sample in Example 1 was measured using a vibrating sample magnetometer (VSM) at a magnetic field of 1500 kA/m. A decrease rate (indicated by %) in comparison with a value of saturation magnetization measured under the same conditions in Comparative Example 1 to be described later was calculated as a saturation magnetization change rate. The saturation magnetization change rate was preferably closer to 0%, and a value of −5% or more was determined as VG, a value of less than −5% and −10% or more was determined as G, and a value of −11% or less was determined as NG. A result is shown in Table 1.

A laminated toroidal core was prepared by using a ribbon sample in which a specific concentration distribution of Fe was formed on a first surface. First, a PET film having a thickness of 38 μm as an insulating layer was bonded to a second surface of the ribbon via an acrylic resin as an adhesive. Next, the ribbon to which the insulating layer was bonded was punched into a toroidal shape having an outer diameter of 18 mm and an inner diameter of 10 mm, and every 10 punched ribbon pieces were used to manufacture a toroidal core sample, such as the toroidal core sample in which a plurality of alloy ribbons 2 was laminated in the same lamination direction L as shown in FIG. 1A.

As shown in FIG. 1B, every 10 punched ribbon pieces were used to manufacture a toroidal core sample, such as the toroidal core sample in which a laminate having the second surfaces 2*b* of the adjacent alloy ribbons 2 facing each other and a laminate having the first surfaces 2*a* of the adjacent alloy ribbons 2 facing each other were laminated to face each other so as to alternately appear along the lamination direction L.

A core loss of each obtained laminated toroidal core sample was measured by a B—H analyzer under conditions of 75 mT and 600 kHz, and a core loss increase rate (denoted by %) was calculated by changing the laminating method from FIG. 1A to FIG. 1B. The core loss was calculated as an average value of three samples. For the core loss increase rate, a value of 10% or more was determined as NG, a value of less than 10% was determined as G, and a value of 6% or less was determined as VG. A result is shown in Table 1.

For three laminated toroidal core samples, core losses before and after a moisture resistance test were calculated under the same measurement conditions as described above, and a core loss increase rate (denoted by %) before and after the moisture resistance test was calculated. The moisture resistance test was performed based on JIS C 60068-2-38: 2013 "Environmental testing (electric and electronic) Composite temperature/humidity cyclic test". However, 10 cycles were performed without including a low temperature sub-cycle. For the core loss increase rate, a value of 5% or more was determined as NG, a value of less than 5% was determined as G, and a value of 3% or less was determined as VG. A result is shown in Table 1.

Example 2

A ribbon sample and laminated toroidal core samples were formed in the same manner as in Example 1 except that the heat treatment was performed on the ribbon under the following conditions, and the same evaluation as in Example 1 was performed.

Results are shown in Table 1.

In Example 2, the oxygen concentration in the second-stage heat treatment was about 15 times the oxygen concentration in Example 1.

Measurement results of a concentration of Fe measured in a depth direction from a first surface in Example 2 are shown in Ex.2 in FIG. 2, and measurement results of B—O are shown in Ex.2 in FIG. 3.

In Example 2, as shown in FIG. 2, it was confirmed that the specific depth D2 at which the concentration of Fe reached 10 at % (Fe 10at % reach depth in Table 1) was about 140 nm from the 0 position on the horizontal axis, and was 18 nm or more and 500 nm or less (or 50 nm to 400 nm).

As shown in FIG. 2, in Example 2, it was confirmed that from the surface depth 0 position to the specific depth D2, the concentration of Fe was less than 10 at %, and the positive increase region P2 was present in which the concentration of Fe increased with the substantially positive concentration gradient. In addition, it was confirmed that at the depth closer to the depth 0 position than the positive increase region P2, the low Fe concentration region having the concentration of Fe of 0.5 at % or less (substantially 0 at %) was continuous at a depth of 15 nm or more.

Further, in Example 2, as shown in Ex.2 in FIG. 3, it was confirmed that when the concentration of B—O was measured with XPS in the depth direction from the first surface (the 0 position on the horizontal axis in the graph of FIG. 3), the concentration of B—O was substantially 0 at % from the first surface to at least 20 nm. In Example 2, as shown in Ex.2 in FIG. 3, it was confirmed that in the region deeper than 20 nm (actually deeper than 60 nm), the B—O-containing region having the concentration of B—O of more than 2 at % or more than 3 at % was continuously present.

Further, as shown in FIG. 3, in Example 2, it was confirmed that the depth position from the first surface where the concentration of B—O was more than 0 at % ("B—O expression depth" also shown in Table 1) was about 65 nm, and was 25 nm or more and less than 360 nm.

SEM images of the first surface in Example 2 are shown in FIGS. 4 and 5. When a surface (the first surface) of the ribbon sample after the heat treatment was observed with SEM and AFM, convex portions having an average height of 10 nm or more and less than 100 nm were observed.

Example 3

A ribbon sample and laminated toroidal core samples were formed in the same manner as in Example 2 except that the heat treatment was performed on the ribbon under the following conditions, and the same evaluation as in Example 2 was performed. Results are shown in Table 1. In Example 3, the heat treatment time in the second stage was about seven times the heat treatment time in Example 2.

Measurement results of a concentration of Fe measured in a depth direction from a first surface in Example 3 are shown in Ex.3 in FIG. 2, and measurement results of B—O are shown in Ex.3 in FIG. 3.

In Example 3, as shown in FIG. 2, it was confirmed that the specific depth D3 at which the concentration of Fe reached 10 at % (Fe 10at % reach depth in Table 1) was about 180 nm from the 0 position on the horizontal axis, and was 18 nm or more and 500 nm or less (or 50 nm to 400 nm).

As shown in FIG. 2, in Example 3, it was confirmed that from the surface depth 0 position to the specific depth D3, the concentration of Fe was less than 10 at %, and the positive increase region P3 was present in which the concentration of Fe increased with the substantially positive concentration gradient. In addition, it was confirmed that at the depth closer to the depth 0 position than the positive increase region P3, the low Fe concentration region having the concentration of Fe of 0.5 at % or less (substantially 0 at %) was continuous at a depth of 15 nm or more.

Further, in Example 3, as shown in Ex.3 in FIG. 3, it was confirmed that when the concentration of B—O was measured with XPS in the depth direction from the first surface (the 0 position on the horizontal axis in the graph of FIG. 3), the concentration of B—O was substantially 0 at % from the first surface to at least 20 nm. In Example 3, as shown in Ex.3 in FIG. 3, it was confirmed that in the region deeper than 20 nm (actually deeper than 120 nm), the B—O-containing region having the concentration of B—O of more than 2 at % or more than 3 at % was continuously present.

Further, as shown in FIG. 3, in Example 3, it was confirmed that the depth position from the first surface where the concentration of B—O was more than 0 at % ("B—O expression depth" also shown in Table 1) was about 129 nm, and was 25 nm or more and less than 360 nm.

An SEM image of the first surface in Example 3 is shown in FIG. 6. When a surface (the first surface) of the ribbon sample after the heat treatment was observed with SEM and AFM, convex portions having an average height of 10 nm or more and less than 100 nm were observed.

Comparative Example 1

A ribbon sample and laminated toroidal core samples were formed in the same manner as in Example 1 except that the heat treatment was not performed on the ribbon, and the same evaluation as in Example 1 was performed. Results are shown in Table 1.

Measurement results of a concentration of Fe are represented by Cex.1 in FIG. 2 and measurement results of B—O are represented by Cex.1 in FIG. 3, which are measured in a depth direction from a first surface in Comparative Example 1.

As shown in FIG. 2, in Comparative Example 1, it was confirmed that the concentration of Fe was 10 at % or more at a position within 18 nm from the surface depth 0 position.

Further, in Comparative Example 1, as shown in Cex.1 in FIG. 3, it was confirmed that when the concentration of B—O was measured with XPS in the depth direction from the first surface (the 0 position on the horizontal axis in the graph of FIG. 3), a peak of the concentration of B—O appeared in a range from the first surface to at least 20 nm.

In Comparative Example 1, even when an SEM image of the first surface was observed, the convex portions having the predetermined range height as shown in FIGS. 4 to 6 were not observed.

Comparative Example 2

A ribbon sample and laminated toroidal core samples were formed in the same manner as in Example 2 except that the heat treatment was performed on the ribbon under the following conditions, and the same evaluation as in Example 2 was performed.

Results are shown in Table 1.

In Comparative Example 2, the heat treatment temperature in the second stage was set to be lower than the heat treatment temperature in Example 2 by about 100° C.

Example 4

A ribbon sample and laminated toroidal core samples were formed in the same manner as in Example 2 except that the heat treatment was performed on the ribbon under the following conditions, and the same evaluation as in Example 2 was performed.

Results are shown in Table 1.

In Example 4, the heat treatment time in the second stage was about 50 times the heat treatment time in Example 2.

Example 5

A ribbon sample and laminated toroidal core samples were formed in the same manner as in Example 4 except that the heat treatment was performed on the ribbon under the following conditions, and the same evaluation as in Example 4 was performed.

Results are shown in Table 1.

In Example 5, the heat treatment temperature in the second stage was set to be higher than the heat treatment temperature in Example 4 by about 50° C.

Comparative Example 3

A ribbon sample and laminated toroidal core samples were formed in the same manner as in Example 5 except that the heat treatment was performed on the ribbon under the following conditions, and the same evaluation as in Example 5 was performed.

Results are shown in Table 1.

In Comparative Example 3, the heat treatment time in the second stage was about three times the heat treatment time in Example 5.

Example 10

A ribbon sample and laminated toroidal core samples were formed in the same manner as in Comparative Example 2 except that the heat treatment was performed on the ribbon under the following conditions, and the same evaluation as in Comparative Example 2 was performed. Results are shown in Table 1.

In Example 10, the heat treatment temperature in the second stage was set to be higher than the heat treatment temperature in Comparative Example 2 by about 50° C.

Example 6

A ribbon sample and laminated toroidal core samples were formed in the same manner as in Example 1 except that raw material metals were weighed to obtain an alloy composition of $Fe_{75}Si_{15}B_6Nb_3Cu_1$ and that the heat treatment in the first stage was performed on the ribbon under an oxidizing active atmosphere, and the same evaluation as in Example 1 was performed. Results are shown in Table 1.

Example 7

A ribbon sample and laminated toroidal core samples were formed in the same manner as in Example 6 except that the oxygen concentration in the second stage was about 15 times that in Example 6, and the same evaluation as in Example 6 was performed. Results are shown in Table 1.

Example 8

A ribbon sample and laminated toroidal core samples were formed in the same manner as in Example 7 except that the heat treatment time was about seven times that in Example 7, and the same evaluation as in Example 7 was performed. Results are shown in Table 1.

Comparative Example 4

A ribbon sample and laminated toroidal core samples were formed in the same manner as in Example 6 except that the heat treatment was not performed on the ribbon, and the same evaluation as in Example 6 was performed. Results are shown in Table 1. The saturation magnetization change rates in Examples 6 to 8 in Table 1 are change rates with respect to Comparative Example 4.

Comparative Example 5

A ribbon sample and laminated toroidal core samples were formed in the same manner as in Example 6 except that the heat treatment was performed on the ribbon under the following conditions, and the same evaluation as in Example 6 was performed.

Results are shown in Table 1.

In Comparative Example 5, the heat treatment temperature in the second stage was set to be lower than the heat treatment temperature in Example 6 by about 100° C.

Evaluation

As shown in Table 1, as compared with Comparative Examples 1 to 5, in Examples 1 to 8 and 10, it was confirmed that when the specific concentration distribution of Fe at the predetermined depth from the surface was formed on the alloy surface, the core loss increase rate was decreased, and the saturation magnetization change rate was decreased. It was confirmed that when the specific depth at which the concentration of Fe reached 10 at % was 50 nm or more and 400 nm or less from the first surface, the core loss increase rate was further decreased, and the saturation magnetization change rate was further decreased. Further, it was confirmed that when the depth position from the first surface where the concentration of B—O was more than 0 at % ("B—O expression depth" also shown in Table 1) was preferably 25 nm or more and more preferably 35 nm or more, the deterioration of the core loss due to the moisture absorbing factor can be effectively prevented.

TABLE 1

| | | Subject Item | Ribbon XPS Fe 10at % reach depth [nm] | Laminated toroidal core Core loss increase rate in facing laminate | Laminated toroidal core Determination | Ribbon VSM Saturation magnetization change rate |
|---|---|---|---|---|---|---|
| Comparative Example 1 | $Fe_{82}Nb_{5.5}B_9P_{1.5}Si_2$ | Untreated | 7 | 12% | NG | 0% |
| Comparative Example 2 | $Fe_{82}Nb_{5.5}B_9P_{1.5}Si_2$ | Yes | 15 | 10% | NG | 0% |
| Example 10 | $Fe_{82}Nb_{5.5}B_9P_{1.5}Si_2$ | Yes | 20 | 8% | G | 0% |
| Example 1 | $Fe_{82}Nb_{5.5}B_9P_{1.5}Si_2$ | Yes | 70 | 5% | VG | −1% |
| Example 2 | $Fe_{82}Nb_{5.5}B_9P_{1.5}Si_2$ | Yes | 140 | 4% | VG | −2% |
| Example 3 | $Fe_{82}Nb_{5.5}B_9P_{1.5}Si_2$ | Yes | 180 | 6% | VG | −3% |
| Example 4 | $Fe_{82}Nb_{5.5}B_9P_{1.5}Si_2$ | Yes | 320 | 4% | VG | −5% |
| Example 5 | $Fe_{82}Nb_{5.5}B_9P_{1.5}Si_2$ | Yes | 500 | 5% | VG | −8% |
| Comparative Example 3 | $Fe_{82}Nb_{5.5}B_9P_{1.5}Si_2$ | Yes | 620 | 3% | VG | −11% |
| Comparative Example 4 | $Fe_{75}Si_{15}B_6Nb_3Cu_1$ | Untreated | 4 | 13% | NG | 0% |
| Comparative Example 5 | $Fe_{75}Si_{15}B_6Nb_3Cu_1$ | Yes | 12 | 11% | NG | 0% |
| Example 6 | $Fe_{75}Si_{15}B_6Nb_3Cu_1$ | Yes | 18 | 7% | G | 0% |

TABLE 1-continued

| | | | | | | |
|---|---|---|---|---|---|---|
| Example 7 | $Fe_{75}Si_{15}B_6Nb_3Cu_1$ | Yes | 32 | 5% | VG | 0% |
| Example 8 | $Fe_{75}Si_{15}B_6Nb_3Cu_1$ | Yes | 67 | 6% | VG | 1% |

| | | Ribbon VSM Determination for saturation magnetization change rate | Ribbon XPS B-O expression depth [nm] | Laminated toroidal core Core loss increase rate before and after moisture resistance test | Laminated toroidal core Determination |
|---|---|---|---|---|---|
| Comparative Example 1 | $Fe_{82}Nb_{5.5}B_9P_{1.5}Si_2$ | | 9 | 12% | NG |
| Comparative Example 2 | $Fe_{82}Nb_{5.5}B_9P_{1.5}Si_2$ | VG | 11 | 8% | NG |
| Example 10 | $Fe_{82}Nb_{5.5}B_9P_{1.5}Si_2$ | VG | 25 | 4% | G |
| Example 1 | $Fe_{82}Nb_{5.5}B_9P_{1.5}Si_2$ | VG | 35 | 1% | VG |
| Example 2 | $Fe_{82}Nb_{5.5}B_9P_{1.5}Si_2$ | VG | 65 | 1% | VG |
| Example 3 | $Fe_{82}Nb_{5.5}B_9P_{1.5}Si_2$ | VG | 129 | 2% | VG |
| Example 4 | $Fe_{82}Nb_{5.5}B_9P_{1.5}Si_2$ | VG | 232 | 1% | VG |
| Example 5 | $Fe_{82}Nb_{5.5}B_9P_{1.5}Si_2$ | G | 358 | 1% | VG |
| Comparative Example 3 | $Fe_{82}Nb_{5.5}B_9P_{1.5}Si_2$ | NG | 443 | 2% | VG |
| Comparative Example 4 | $Fe_{75}Si_{15}B_6Nb_3Cu_1$ | | 0 | 7% | NG |
| Comparative Example 5 | $Fe_{75}Si_{15}B_6Nb_3Cu_1$ | VG | 15 | 5% | NG |
| Example 6 | $Fe_{75}Si_{15}B_6Nb_3Cu_1$ | VG | 21 | 2% | VG |
| Example 7 | $Fe_{75}Si_{15}B_6Nb_3Cu_1$ | VG | 43 | 1% | VG |
| Example 8 | $Fe_{75}Si_{15}B_6Nb_3Cu_1$ | VG | 59 | 1% | VG |

REFERENCE SIGNS LIST

2 (soft magnetic alloy) ribbon
**2*a*** first surface
**2*b*** second surface
4, **4*a*, 4*b*** adhesive layer
20, **20*a*** laminate

What is claimed is:

1. A magnetic alloy ribbon comprising Fe, wherein a specific depth at which a concentration of Fe reaches 10 at % is 18 nm or more and 500 nm or less from a first surface of the ribbon, from the first surface to the specific depth, the concentration of Fe is less than 10 at %, a positive increase region is present in which the concentration of Fe increases in a case where the concentration of Fe is measured in a depth direction from the first surface, and at a depth closer to the first surface than the positive increase region, a low Fe concentration region having a concentration of Fe of 0.5 at % or less is continuous at a depth of 10 nm or more.

2. The magnetic alloy ribbon according to claim 1, further comprising B.

3. The magnetic alloy ribbon according to claim 2, wherein a depth position from the first surface where a concentration of B—O is more than 0 at % is 25 nm or more and less than 360 nm.

4. The magnetic alloy ribbon according to claim 1, wherein the magnetic alloy ribbon has a composition containing 70 at % or more of Fe.

5. The magnetic alloy ribbon according to claim 1, wherein a thickness is 100 μm or less.

6. The magnetic alloy ribbon according to claim 1, wherein a specific depth at which a concentration of Fe reaches 10 at % is 18 nm or more and 500 nm or less from a second surface located on a side opposite to the first surface of the ribbon, from the second surface to the specific depth, the concentration of Fe is less than 10 at %, and a positive increase region is present in which the concentration of Fe increases in a case where a concentration of Fe is measured in a depth direction from the second surface.

7. The magnetic alloy ribbon according to claim 1, wherein the magnetic alloy ribbon is made of a soft magnetic alloy.

8. A stacked body having a structure in which the magnetic alloy ribbon according to claim 1 is stacked.

9. A magnetic core, comprising the magnetic alloy ribbon according to claim 1.

10. A magnetic core, comprising the stacked body according to claim 8.

* * * * *